US010775047B2

(12) United States Patent  
Horikawa et al.

(10) Patent No.: US 10,775,047 B2  
(45) Date of Patent: Sep. 15, 2020

(54) COMBUSTOR FOR GAS TURBINE ENGINE

(71) Applicants: KAWASAKI JUKOGYO KABUSHIKI KAISHA, Kobe-shi, Hyogo (JP); B&B AGEMA GmbH, Aachen (DE)

(72) Inventors: Atsushi Horikawa, Akashi (JP); Masahide Kazari, Akashi (JP); Kunio Okada, Kakogawa (JP); Junichi Kitajima, Akashi (JP); Harald Funke, Aachen (DE); Karsten Kusterer, Moresnet (BE); Anis Haj Ayed, Kelmis (BE)

(73) Assignees: KAWASAKI JUKOGYO KABUSHIKI KAISHA, Hyogo, Kobe-shi (JP); B&B AGEMA GmbH, Aachen (DE)

( * ) Notice: Subject to any disclaimer, the term of this patent is extended or adjusted under 35 U.S.C. 154(b) by 334 days.

(21) Appl. No.: 15/363,414

(22) Filed: Nov. 29, 2016

(65) Prior Publication Data

US 2017/0082291 A1    Mar. 23, 2017

Related U.S. Application Data

(63) Continuation of application No. PCT/JP2015/002714, filed on May 28, 2015.

(30) Foreign Application Priority Data

May 30, 2014   (JP) .................................. 2014-113268

(51) Int. Cl.
*F23R 3/00* (2006.01)
*F23R 3/28* (2006.01)
(Continued)

(52) U.S. Cl.
CPC .............. *F23R 3/286* (2013.01); *F02C 7/222* (2013.01); *F23D 14/70* (2013.01); *F23R 3/002* (2013.01);
(Continued)

(58) Field of Classification Search
CPC .. F23R 3/286; F23R 3/002; F23R 3/16; F23R 3/28; F23R 3/283; F23R 3/34; F23R 3/10; F23R 3/18; F23D 2209/20
See application file for complete search history.

(56) References Cited

U.S. PATENT DOCUMENTS 4,898,001 A * 2/1990 Kuroda ..................... F23R 3/04
60/733
5,361,586 A   11/1994 McWhirter et al.
(Continued)

FOREIGN PATENT DOCUMENTS

EP    2 375 163 A2   10/2011
EP    2 631 544 A1    8/2013
(Continued)

OTHER PUBLICATIONS

International Preliminary Report on Patentability and Written Opinion dated Dec. 15, 2016, from the International Bureau in counterpart International application No. PCT/JP2015/002714.
(Continued)

*Primary Examiner* — Todd E Manahan
*Assistant Examiner* — Edwin Kang
(74) *Attorney, Agent, or Firm* — Sughrue Mion, PLLC

(57) ABSTRACT

A combustor includes: a combustion liner having a combustion chamber formed therein; and a fuel injector mounted to a top portion of the combustion liner, and including a fuel injection member having a plurality of fuel injection annular portions and an air guide member including a plurality of combustion air annular portions that guide air for combus-
(Continued)

tion. The fuel injection annular portions and the combustion air annular portions are arranged concentrically and alternately. The fuel injector injects fuel and air into the combustion chamber. Each of the fuel injection annular portions includes a plurality of fuel injection holes that are open in a radial direction thereof, and each of the combustion air annular portions includes a plurality of air guide grooves that are open in an axial direction thereof, and guide the air to the fuel jetted from the fuel injection holes.

11 Claims, 13 Drawing Sheets

(51) Int. Cl.
  F23R 3/34 (2006.01)
  F23R 3/18 (2006.01)
  F23D 14/70 (2006.01)
  F02C 7/22 (2006.01)
  F23R 3/10 (2006.01)
  F23R 3/16 (2006.01)
(52) U.S. Cl.
  CPC ............... *F23R 3/10* (2013.01); *F23R 3/16* (2013.01); *F23R 3/18* (2013.01); *F23R 3/34* (2013.01); *F05D 2220/32* (2013.01); *F05D 2240/35* (2013.01); *F23C 2900/9901* (2013.01); *Y02T 50/678* (2013.01)

(56) References Cited

U.S. PATENT DOCUMENTS

| | | | |
|---|---|---|---|
| 5,421,158 A | 6/1995 | Stenger et al. | |
| 5,660,045 A * | 8/1997 | Ito | F23D 23/00 60/737 |
| 5,713,206 A | 2/1998 | McWhirter et al. | |
| 6,267,585 B1 * | 7/2001 | Suttrop | F23D 14/20 239/420 |
| 6,880,340 B2 | 4/2005 | Saitoh | |
| 7,143,583 B2 * | 12/2006 | Hayashi | F23R 3/18 60/776 |
| 8,172,568 B2 | 5/2012 | Kashihara et al. | |
| 8,322,143 B2 | 12/2012 | Uhm et al. | |
| 8,418,468 B2 | 4/2013 | McMahan et al. | |
| 8,424,311 B2 | 4/2013 | York et al. | |
| 8,468,831 B2 * | 6/2013 | Venkataraman | F23D 11/38 239/399 |
| 8,511,097 B2 | 8/2013 | Kobayashi et al. | |
| 8,656,721 B2 | 2/2014 | Matsumoto et al. | |
| 2003/0110774 A1 | 6/2003 | Saitoh | |
| 2005/0268614 A1 | 12/2005 | Widener | |
| 2008/0041060 A1 * | 2/2008 | Nilsson | F23R 3/14 60/737 |
| 2008/0173019 A1 | 7/2008 | Kobayashi et al. | |
| 2010/0136496 A1 | 6/2010 | Kashihara et al. | |
| 2010/0192581 A1 * | 8/2010 | Ziminsky | F23R 3/286 60/737 |
| 2010/0218501 A1 | 9/2010 | York et al. | |
| 2011/0239652 A1 | 10/2011 | McMahan et al. | |
| 2011/0252803 A1 | 10/2011 | Subramanian et al. | |
| 2012/0180495 A1 | 7/2012 | Uhm et al. | |
| 2013/0139511 A1 | 6/2013 | Sometani et al. | |
| 2013/0219899 A1 * | 8/2013 | Uhm | F23R 3/286 60/738 |
| 2013/0232979 A1 | 9/2013 | Singh | |
| 2013/0318975 A1 | 12/2013 | Stoia et al. | |
| 2013/0318977 A1 * | 12/2013 | Berry | F23R 3/283 60/739 |
| 2014/0116053 A1 | 5/2014 | Chen et al. | |
| 2014/0260271 A1 * | 9/2014 | Keener | F23R 3/10 60/737 |
| 2015/0253011 A1 | 9/2015 | Uhm et al. | |
| 2016/0290646 A1 * | 10/2016 | Abe | F23R 3/12 |
| 2017/0074521 A1 * | 3/2017 | Horikawa | F02C 7/232 |

FOREIGN PATENT DOCUMENTS

| | | |
|---|---|---|
| JP | 06-323543 A | 11/1994 |
| JP | 8-210641 A | 8/1996 |
| JP | 9-178128 A | 7/1997 |
| JP | 11-264542 A | 9/1999 |
| JP | 2002-364849 A | 12/2002 |
| JP | 2010-203758 A | 9/2010 |
| JP | 2012-141078 A | 7/2012 |
| JP | 2012-149869 A | 8/2012 |
| JP | 2013-190201 A | 9/2013 |
| WO | 2006/100983 A1 | 9/2006 |
| WO | 2009/022449 A1 | 2/2009 |

OTHER PUBLICATIONS

Communication dated Oct. 26, 2017 issued by the Intellectual Property Office of Australia in counterpart application No. 2015265278.
Communication dated Aug. 8, 2017 from the Japanese Patent Office in counterpart application No. 2017-515291.
International Search Report for PCT/JP2015/002714 dated Oct. 23, 2015 [PCT/ISA/210].
Communication dated Jan. 9, 2018 from the Japanese Patent Office in counterpart Japanese application No. 2017-515291.
An Office Action dated Nov. 26, 2018, which issued during the prosecution of U.S. Appl. No. 15/363,105.
Communication dated Sep. 12, 2017 from the Canadian Patent Office in counterpart Canadian application No. 2,950,558.

* cited by examiner

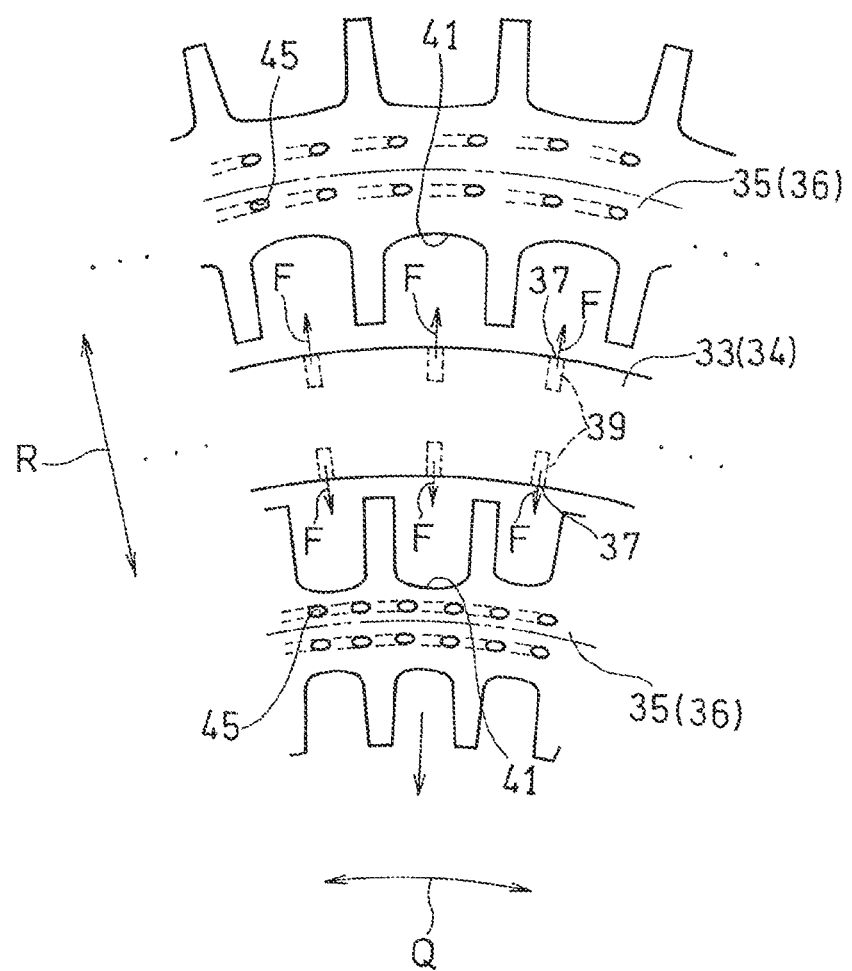

COMBUSTOR FOR GAS TURBINE ENGINE

CROSS REFERENCE TO THE RELATED APPLICATION

This application is a continuation application, under 35 U.S.C. § 111(a), of international application No. PCT/JP2015/002714, filed May 28, 2015, which claims priority to Japanese patent application No. 2014-113268, filed May 30, 2014, the disclosure of which are incorporated by reference in their entirety into this application.

BACKGROUND OF THE INVENTION

Field of the Invention

The present invention relates to combustors used in gas turbine engines.

Description of Related Art

For environment protection purposes, in gas turbine engines, strict environmental standards are set for the composition of emitted combustion exhaust gas. It is required to reduce harmful substances such as nitrogen oxide (hereinafter referred to as $NO_x$) from the exhaust gas. Under such circumstances, in recent years, a combustion system adopting a premix combustion system which effectively reduces the amount of generated $NO_x$, for example, a combined combustion system obtained by combining a lean premix combustion system and a diffusion combustion system, has been proposed (Patent Document 1).

When the premix combustion system is adopted, air and fuel are premixed and combusted as a lean air-fuel mixture whose fuel concentration is uniformized. Therefore, a combustion region where the flame temperature is locally high does not exist. In addition, the flame temperature can be lowered across the whole region by dilution of the fuel. On this account, the amount of generated $NO_x$ can be effectively reduced.

RELATED ART DOCUMENT

Patent Document

[Patent Document 1] Japanese Laid-open Patent Publication No. 8-210641

SUMMARY OF THE INVENTION

On the other hand, in the premix combustion system, in order to maintain the combustion by the lean fuel, flame stabilization is performed by causing a strong swirl flow in a combustion chamber to form a reverse flow region. Therefore, backfiring phenomenon in which flame generated in the combustion chamber is propagated to a premixing passage, is likely to occur. In recent years, a gas turbine engine using hydrogen as a fuel has been proposed. However, in a gas turbine engine using a highly reactive fuel including hydrogen, the backfiring phenomenon is particularly likely to occur.

Therefore, in order to solve the above-described problems, an object of the present invention is to provide a combustor of a gas turbine engine, which device is able to prevent local high-temperature combustion to suppress generation of $NO_x$, and prevent backfiring phenomenon to stably maintain flame.

In order to achieve the above objects, a combustor according to the present invention includes: a combustion liner having a combustion chamber formed therein; and a fuel injector mounted to a top portion of the combustion liner and configured to inject fuel and air into the combustion chamber, the fuel injector including a fuel injection member having a plurality of fuel injection annular portions, and an air guide member having a plurality of combustion air annular portions that guide an air for combustion, the fuel injection annular portions and the combustion air annular portions being arranged concentrically and alternately; in which each of the fuel injection annular portions includes a plurality of fuel injection holes that are open in a radial direction thereof, and each of the combustion air annular portions includes a plurality of air guide grooves that are open in an axial direction thereof, and guides the air to the fuel jetted from the fuel injection holes.

According to the above configuration, the fuel is jetted from the plurality of fuel injection holes formed in the fuel injection member, and thereby minute flame is maintained at multiple points. In addition, since the fuel radially jetted from the fuel injection holes is deflected at 900 by the axially flowing air, mixing outside the fuel injector is promoted. Thereby, local high-temperature combustion is prevented, and low $NO_x$ combustion is realized. Further, the structure in which the air is supplied from upstream of the fuel jetted from the fuel injection holes, prevents the flame from entering the fuel injector, whereby backfiring phenomenon is suppressed. Therefore, even when a highly-reactive fuel containing hydrogen is used as the fuel for the gas turbine, extremely stable combustion is maintained while suppressing generation of $NO_x$.

In one embodiment of the present invention, the combustor may further include an air-flow rectifying mechanism provided upstream of the fuel injector, and configured to rectify flow of the air supplied to the air guide member. According to this configuration, since uniform air flow is supplied to the fuel injector, combustion is further uniformized, whereby generation of $NO_x$ is suppressed, and backfiring phenomenon can be prevented more reliably.

In one embodiment of the present invention, the combustor may further include a rectifying protrusion member which is provided on an axis of the combustor, and penetrates through the fuel injector and protrudes toward the combustion chamber. According to this configuration, since flame which is formed by the fuel and air jetted from the radially inner portion of the fuel injector is stabilized, combustion is stably maintained.

In one embodiment of the present invention, the rectifying protrusion member may include a support portion, and a protruding portion protruding from the support portion into the combustion chamber, and has a cooling air introduction hole that is formed in the support portion and introduces the air into the rectifying protrusion member, and a cooling air discharge hole that is formed in the protruding portion and discharges the air introduced into the rectifying protrusion member, to the combustion chamber. According to the above configuration, the protruding portion can be cooled with a part of the air for combustion, from the inner side, by convection cooling.

In one embodiment of the present invention, each of the fuel injection annular portions may be formed as a hollow portion, and a hollow space in the fuel injection annular portion forms an annular fuel flow passage that allows the fuel to flow in a circumferential direction thereof. A portion, of the fuel injection annular portion, opposing the combustion chamber is exposed to high temperature caused by the flame in the combustion chamber. However, according to the above configuration, since the annular fuel flow passage that allows the fuel to flow is formed in the fuel injection annular portion, the portion exposed to the high temperature is efficiently cooled by the fuel that flows through the fuel flow passage.

In one embodiment of the present invention, the fuel injection annular portion may include: a first fuel flow passage that is positioned on a combustion chamber side and is communicated with the fuel injection holes; a second fuel flow passage that is positioned on a side opposite to the combustion chamber, and is supplied with the fuel jetted from the fuel injection holes; and an injection nozzle configured to jet the fuel in the second fuel flow passage to a wall surface of the first fuel flow passage on the combustion chamber side. According to the above configuration, the wall, of the fuel injection annular portion, opposing the combustion chamber can be cooled with the fuel, from the inner side, by impingement cooling.

In one embodiment of the present invention, the combustor may include a fuel supply main pipe having a multiple pipe structure, and configured to supply the fuel to the fuel injection member. The fuel supply main pipe may include a first supply passage configured to supply the fuel to a first annular portion group of the plurality of fuel injection annular portions, and a second supply passage configured to supply the fuel to a second annular portion group of the plurality of fuel injection annular portions. According to this configuration, since the fuel injection member can be divided into the fuel injection annular portions that perform fuel supply and the fuel injection annular portions that do not perform fuel supply. Therefore, an operation according to output change from a rated load to a partial load (staging combustion) is realized.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5B is a front view showing one modified example of the fuel injector shown in FIG. 5A;

DESCRIPTION OF EMBODIMENTS

Hereinafter, embodiments of the present invention will be described with reference to the drawings, but the present invention is not limited to the embodiments.

Figure 1:
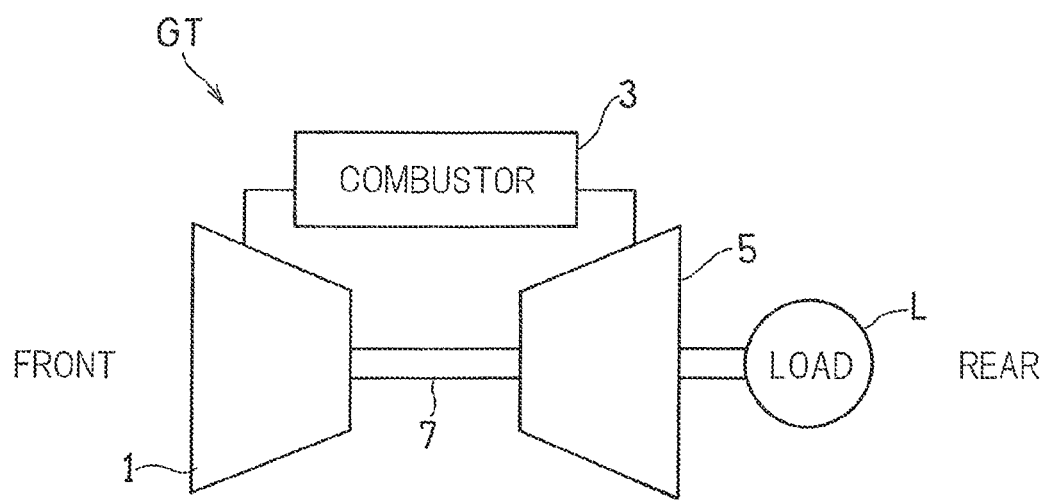
FIG. 1 is a block diagram showing a schematic configuration of a gas turbine engine in which a combustor according to one embodiment of the present invention is applied.

FIG. 1 shows a schematic configuration of a gas turbine engine (hereinafter referred to simply as a gas turbine) GT in which a combustor according to an embodiment of the present invention is applied. In the gas turbine GT, introduced air is compressed by a compressor 1 and guided to a combustor 3, and fuel is injected into the combustor 3. The fuel is combusted with the air, and the resulting high-temperature and high-pressure combustion gas drives a turbine 5. The turbine 5 is connected to the compressor 1 via a rotary shaft 7, and the compressor 1 is driven by the turbine 5. A load L such as a rotor of an aircraft or a generator is driven by an output of the gas turbine GT. In the present embodiment, hydrogen gas is used as the fuel injected into the combustor 3. In the following description, a side, in an axial direction of the gas turbine GT, on which the compressor 1 is disposed is referred to as a "front side", and a side, in the axial direction, on which the turbine 5 is disposed is referred to as a "rear side".

Figure 2:
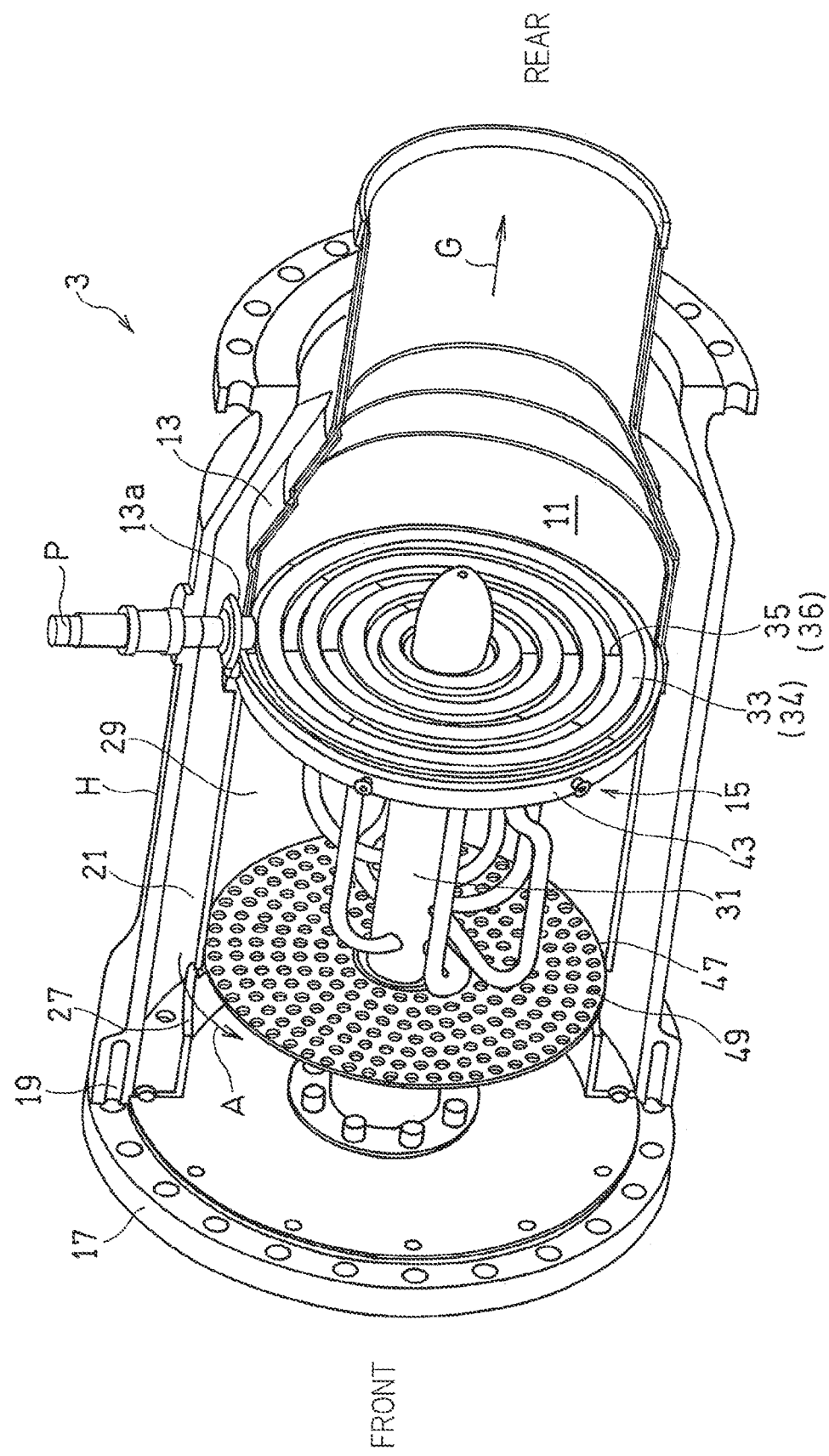
FIG. 2 is a cross-sectional view of the combustor according to the embodiment of the present invention.
Figure 3:
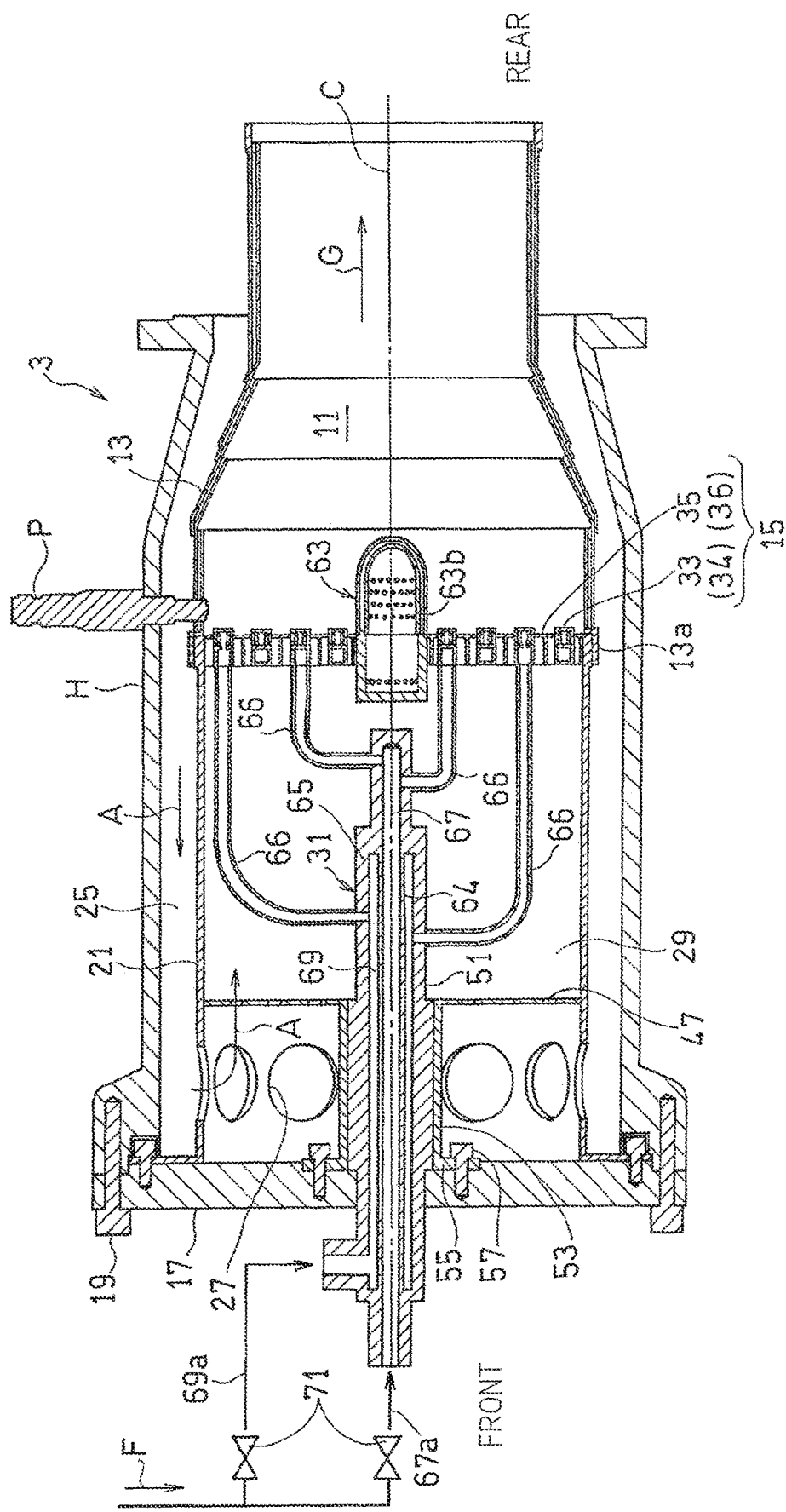
FIG. 3 is a cross-sectional view of the combustor according to the embodiment of the present invention.

FIG. 2 is a partially cutaway perspective view of the combustor 3. The combustor 3 is a can type combustor, in which a plurality of combustors 3 are annularly arranged about the axis of the gas turbine GT. The combustor 3 includes a combustion liner 13 having a combustion chamber 11 formed therein, and a fuel injector 15 mounted to a top portion 13a of the combustion liner 13, and injecting fuel and air into the combustion chamber 11. When the fuel and the air jetted from the fuel injector 15 are ignited by an ignition plug P provided in the combustion liner 13, flame is formed in the combustion chamber 11. The combustion liner 13 and the fuel injector 15 are concentrically housed in a substantially cylindrical housing H which is an outer liner of the combustor 3. An end cover 17 is fixed to a front end of the housing H by means of bolts 19. As shown in FIG. 3, a support tube 21 cylindrically extending from the combustion liner 13 is connected and fixed to the end cover 17 by means of bolts or the like, whereby the top portion 13a of the combustion liner 13 is mounted to the housing H.

In the present embodiment, the combustor 3 is configured as a reverse-flow type combustor, in which the flow directions of air A and combustion gas G are opposite to each other. Specifically, the combustor 3 includes an air introduction passage 25 formed between the housing H, and the combustion liner 13 and the support tube 21. The air introduction passage 25 guides the air A compressed by the compressor 1 (FIG. 1) in a direction opposite to the flow direction of the combustion gas G in the combustion chamber 11. The combustor 3 may be of an axial-flow type in which the flow direction of the air A is same as that of the combustion gas. At a front end portion of a circumferential wall of the support tube 21, a plurality of air introduction holes 27 are arranged in a circumferential direction. The air A sent through the air introduction passage 25 passes through the air introduction holes 27, and is introduced to an air supply passage 29 formed inside the support tube 21. The air introduced to the air supply passage 29 is sent rearward, that is, toward the fuel injector 15. In addition, a fuel supply main pipe 31 extending along an axis C of the combustor 3 is provided in the center of the air supply passage 29. A fuel F is supplied from the fuel supply main pipe 31 to fuel injection annular portions 33 of a fuel injection member 34 which will be described later. The structures of the air supply passage 29 and the fuel supply main pipe 31 will be described later in detail.

Figure 4:
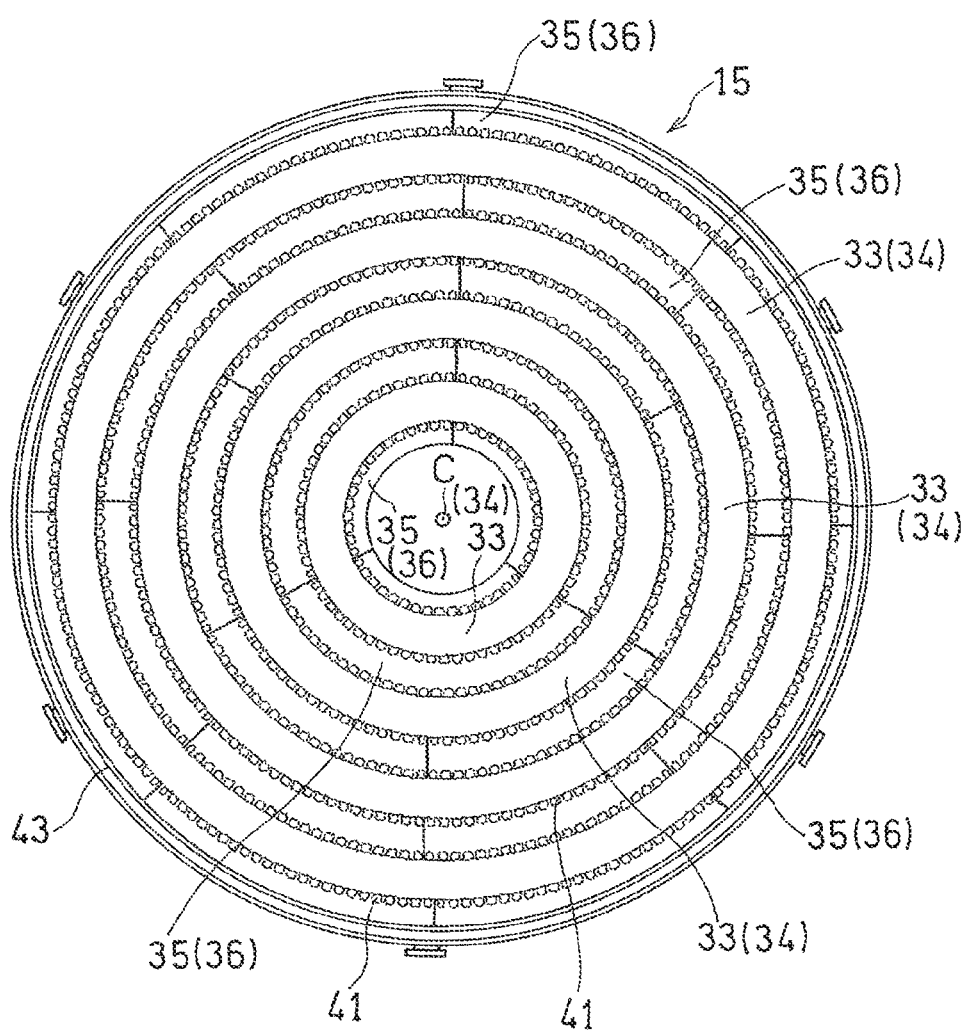
FIG. 4 is a front view of a fuel injector used in the combustor shown in FIG. 2.

As shown in FIG. 4, the fuel injector 15 includes the fuel injection member 34 having a plurality of fuel injection annular portions 33, and an air guide member 36 having a plurality of combustion air annular portions 35. In the present embodiment, four fuel injection annular portions 33 having different diameters are disposed concentrically with each other, and concentrically with the combustor 3 (FIG. 2). In addition, five combustion air annular portions 35 having different diameters are disposed concentrically with each other, and concentrically with the combustor 3 (FIG. 2). Further, the fuel injection annular portions 33 and the combustion air annular portions 35 are alternately disposed so as to have the same center axis. That is, the fuel injection annular portions 33 and the combustion air annular portions 35 are alternately and concentrically disposed. Further, while in the present embodiment the fuel injector 15 includes the four fuel injection annular portions 33 and the five combustion air annular portions 35, the numbers of these portions may be changed according to need. For example, the fuel injector 15 may include three fuel injection annular portions 33 and four combustion air annular portions 35.

In the present embodiment, the four fuel injection annular portions 33 and the five combustion air annular portions 35 are disposed in the same axial position (FIG. 3). However, the axial positions of the four fuel injection annular portions 33 and the five combustion air annular portions 35 may be displaced from each other. For example, the four fuel injection annular portions 33 may be disposed so that the axial positions thereof are displaced alternately forward and rearward, and the five combustion air annular portions 35 may be disposed so that the axial positions thereof are displaced alternately forward and rearward in accordance with the axial positions of the corresponding fuel injection annular portions 33.

Figure 5A:
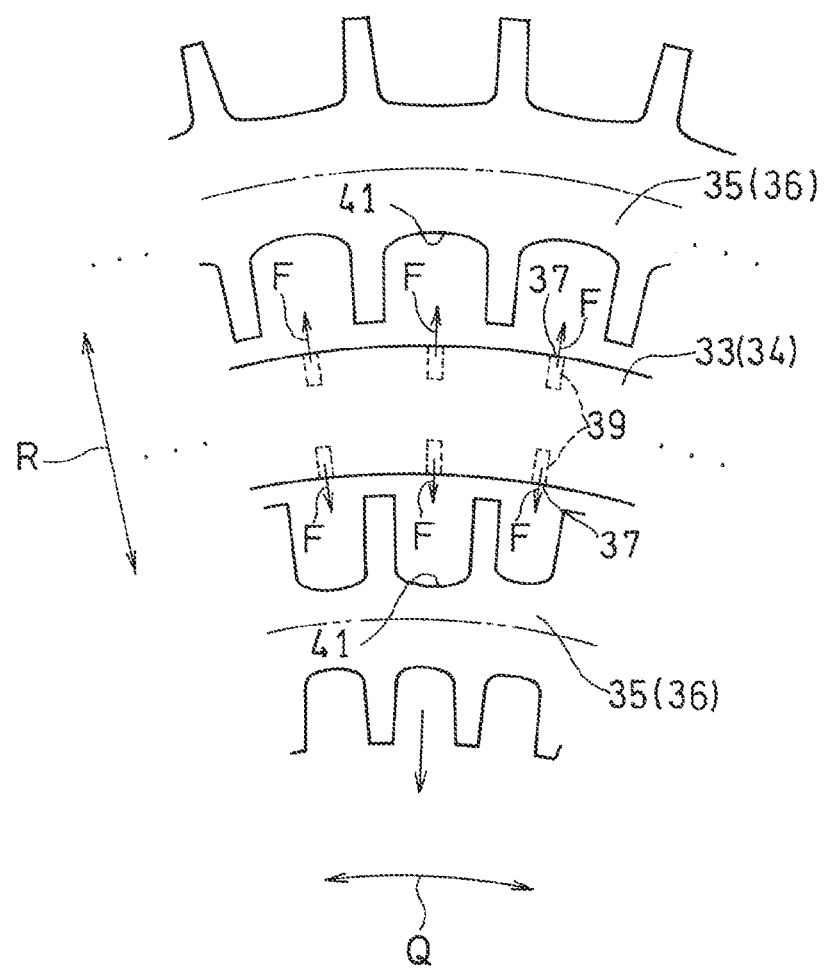
FIG. 5A is a front view showing an enlarged portion of the fuel injector used in the combustor shown in FIG. 2.
Figure 8:
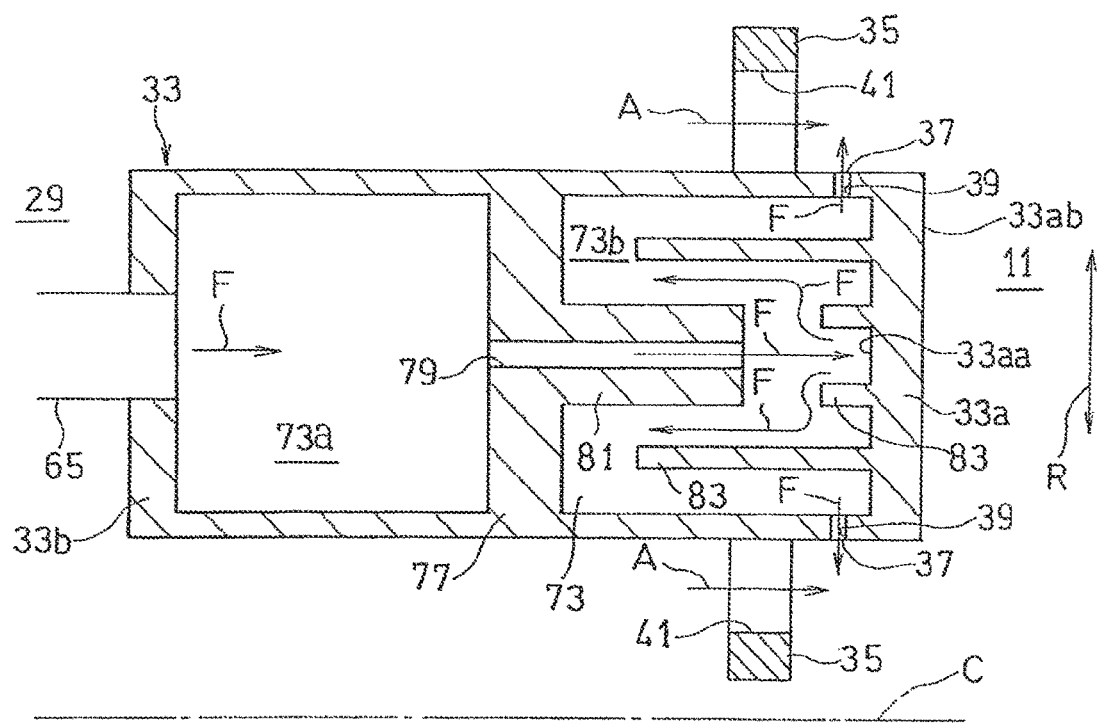
FIG. 8 is a vertical cross-sectional view showing the fuel injector used in the combustor shown in FIG. 2.

As shown in FIG. 5, in each fuel injection annular portion 33 of the fuel injection member 34, a plurality of fuel injection holes 39 that are open in a radial direction R are provided in a circumferential direction Q. The fuel F is jetted from each fuel injection hole 39. As shown in FIG. 8, the fuel injection annular portion 33 of the fuel injection member 34 is formed to have a substantially rectangular cross-sectional outline, and is disposed so that a rear wall 33a thereof opposing the combustion chamber 11 is perpendicular to the axis C direction. In the illustrated example, the fuel injection holes 39 are provided on both the outer diameter side and the inner diameter side of the fuel injection annular portion 33 of the fuel injection member 34. In other words, the fuel injection holes 39 are provided in each of an outer circumferential wall and an inner circumferential wall of the fuel injection annular portion 33, as through-holes penetrating through the outer circumferential wall and the inner circumferential wall in the radial direction R. However, the fuel injection holes 39 may be provided on only one of the outer diameter side and the inner diameter side of the fuel injection member 34. The fuel injection holes 39 may be angled within a range of −10° to +800 in the axis C direction with respect to the radial direction R. It is to be noted that when the injection hole 39 is inclined towards an upstream side of the axis C direction with respect to the radial direction R, the inclination angle is defined as a negative angle, while when the injection hole 39 is inclined towards a downstream side of the axis C direction with respect to the radial direction R, the inclination angle is defined as a positive angle.

The air guide member 36 guides the air A to the fuel F jetted from the fuel injection holes 39 of the fuel injection member 34. More specifically, the air guide member 36 guides the air A to the fuel F from upstream side of the air supply passage 29 in the direction along the axis C. The air guide member 36 includes the plurality of annular-plate shaped combustion air annular portions 35. The fuel injection annular portions 33 of the fuel injection member 34 and the combustion air annular portions 35 of the air guide member 36 are alternately disposed so as to have the same center axis. As shown in FIG. 5, in each combustion air annular portion 35 of the air guide member 36, air guide grooves 41 recessed in the radial direction are formed at circumferential positions corresponding to the respective fuel injection holes 39 of the fuel injection member 34. That is, in the illustrated example, each air guide groove 41 recessed radially outward is formed on the inner diameter side of the combustion air annular portion 35 of the air guide member 36 positioned on the radially outer side of the fuel injection annular portion 33 of the fuel injection member 34, and each air guide groove 41 recessed radially inward is formed on the outer diameter side of the combustion air annular portion 35 positioned on the radially inner side of the fuel injection annular portion 33.

As shown in FIG. 4, in the present embodiment, one combustion air annular portion 35 is disposed between two fuel injection annular portions 33, and the air guide grooves 41 are provided on both the outer diameter side and the inner diameter side of the combustion air annular portion 35. Therefore, the fuel injector 15 includes the fuel injection member 34 having four fuel injection annular portions 33, and the air guide member 36 having five combustion air annular portions 35. Specifically, there are provided the combustion air annular portion 35 disposed on the outer circumferential side of the outermost-circumferential-side fuel injection annular portion 33, the three combustion air annular portions 35 disposed between the four fuel injection annular portions 33, and the combustion air annular portion 35 disposed on the inner circumferential side of the innermost-diameter-side fuel injection annular portion 33. The outer circumference of the combustion air annular portion 35 disposed at the outermost circumference of the air guide member 36 is covered with an annular supporting ring member 43. As shown in FIG. 2, by connecting the supporting ring member 43 to the combustion liner 13, the fuel injector 15 is supported by the combustion liner 13.

Figure 9:
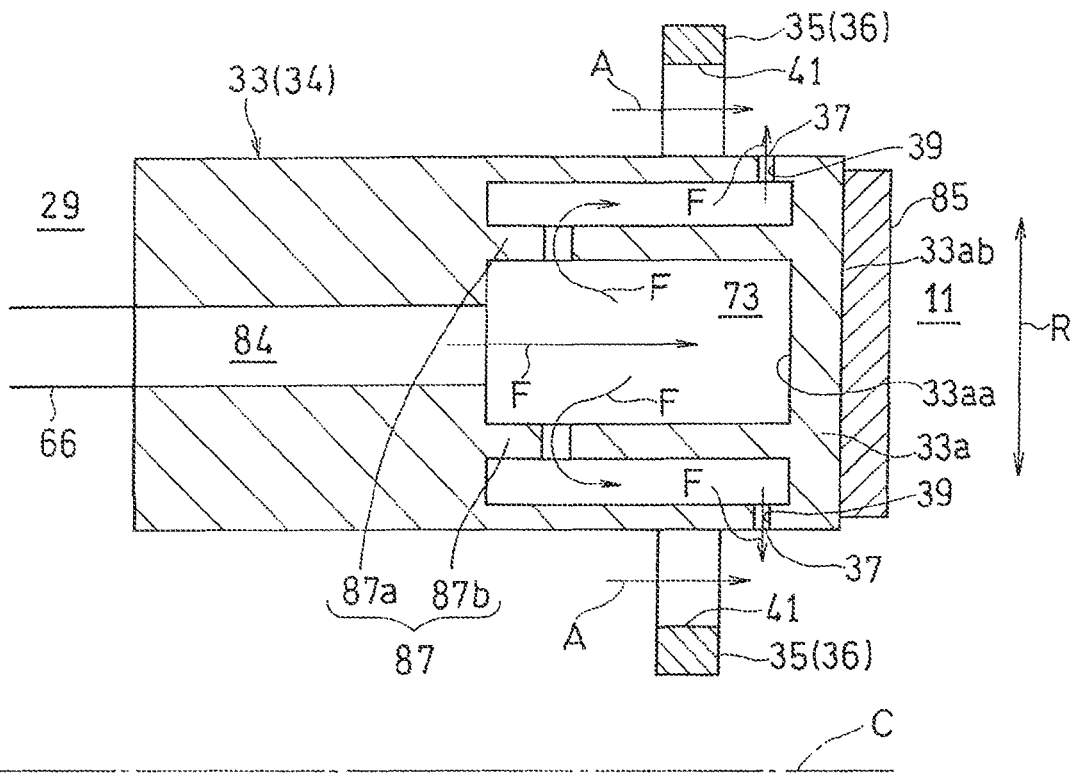
FIG. 9 is a vertical cross-sectional view showing a modification of a fuel injector used in the combustor shown in FIG. 2.

As shown in FIGS. 8 and 9, the air guide member 36 is disposed on the front side relative to the fuel injection holes 39 of the fuel injection member 34, that is, disposed on the upstream side in the flow direction of the air A. Thus, since the air guide member 36 is provided so as to guide the air A in the axis C direction from upstream to the fuel F jetted from each fuel injection hole 39, the fuel F and the air A intersect each other substantially perpendicularly, whereby the fuel F and the air A can be uniformly mixed outside the fuel injector 15.

As shown in FIG. 5B, in one modified example of the present embodiment, each combustion air annular portion 35 of the air guide member 36 may be formed with a plurality of cooling holes 45. The plurality of cooling holes 45 are arranged equally spaced from each other in a circumferential direction of the combustion air annular portion 35. Each of the cooling hole 45 is formed as a through-hole having a substantially round sectional shape which extends completely through the combustion air annular portion 35 from its front side to rear side. In the illustrated example, each cooling hole 45 is so formed as to extend obliquely in the circumferential direction in the combustion air annular portion 35. Accordingly, at respective surfaces of the combustion air annular portion 35, the cooling hole has openings each having oval shape elongated in the circumferential direction. When the cooling holes 45 are formed in the combustion air annular portion 35, the air A having flowed in the air supply passage 29 flows through the cooling hole 45 and is subsequently injected onto the surface on the combustion chamber side of the combustion air annular portion 35 to form an air film layer along the circumferential direction to perform effusion cooling on the surface. Even though the cooling hole 45 may be inclined in the circumferential direction, the inclination direction is not limited thereto. Alternatively, the cooling hole 45 may be formed as a through-hole extending parallel to the axial direction without being inclined.

As shown in FIG. 2, in the air supply passage 29, an air-flow rectifying plate 47 is provided as an air-flow rectifying mechanism that rectifies flow of the air A introduced from the air introduction holes 27 to the air supply passage 29 into a uniform air flow toward the air guide member 36. The air-flow rectifying plate 47 is a disk-like member, and has a plurality of through-holes 49 penetrating the air-flow rectifying plate 47 in the axial direction. The air-flow rectifying plate 47 has an outer diameter corresponding to the inner diameter of the support tube 21 shown in FIG. 3, and includes, in a center portion thereof, a fitting hole 51 having an inner diameter corresponding to the outer diameter of the fuel supply main pipe 31. In the present embodiment, a cylindrical fitting part 53 that fits an outer circumferential surface of the fuel supply main pipe 31 is provided so as to protrude forward in the axis C direction from the fitting hole 51 of the air-flow rectifying plate 47. The air-flow rectifying plate 47 is connected and fixed to the end cover 17 via a flange 55 provided at a front end of the fitting part 53, by means of rectifying plate bolts 57.

Figure 6A:
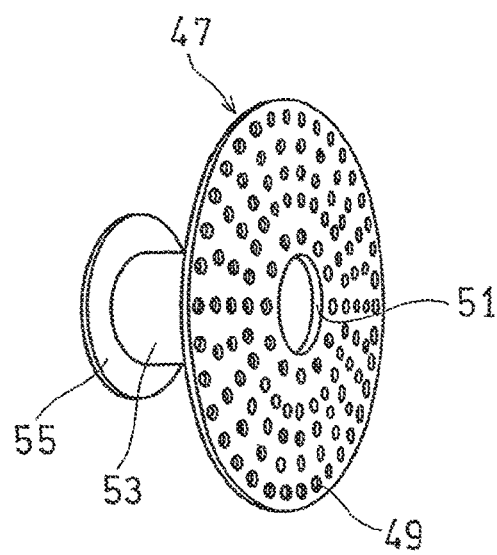
FIG. 6A is a perspective view showing an example of an air-flow rectifying plate used in the combustor shown in FIG. 2.

In the illustrated example, the air-flow rectifying plate 47 includes a plurality of circular through-holes 49 having the same diameters. More specifically, the through-holes 49 are arranged in such a manner that a plurality of annular arrays, each array having the through-holes 49 disposed at equal intervals in the same radial position on the air-flow rectifying plate 47 along the circumferential direction thereof, are arranged at equal intervals in the radial direction. That is, the air-flow rectifying plate 47 includes a plurality of annular arrays of through-holes 49, each in which the through-holes 49 are disposed at equal intervals on the same circumference, and the annular arrays are concentrically arranged on the air-flow rectifying plate 47. FIG. 6A shows the air-flow rectifying mechanism including the air-flow rectifying plate 47, the fitting part 53, and the flange 55.

Figure 6B:
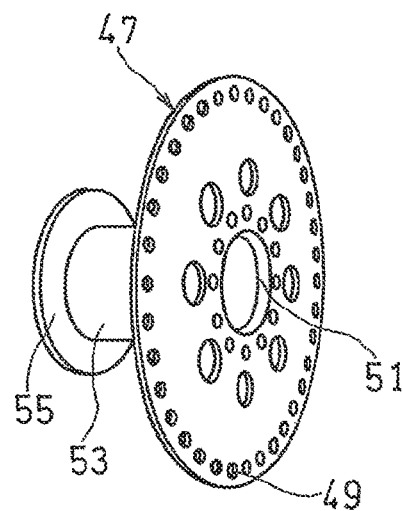
FIG. 6B is a perspective view showing another example of an air-flow rectifying plate used in the combustor shown in FIG. 2.
Figure 6C:
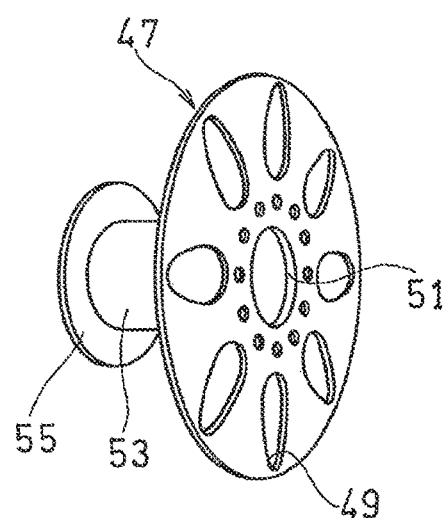
FIG. 6C is a perspective view showing another example of an air-flow rectifying plate used in the combustor shown in FIG. 2.
Figure 6D:
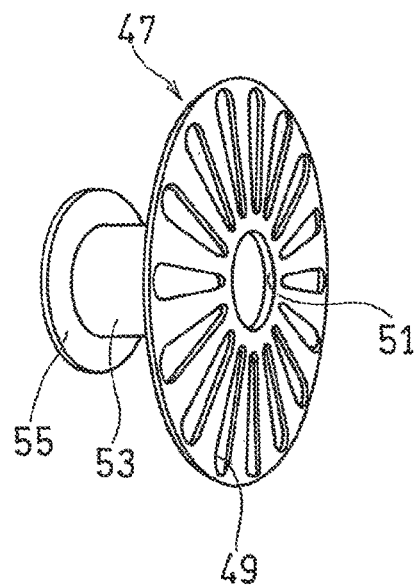
FIG. 6D is a perspective view showing another example of an air-flow rectifying plate used in the combustor shown in FIG. 2.

However, the shape, number, and positions of the plurality of through-holes 49 in the air-flow rectifying plate 47 are not limited to those shown in FIG. 6A, and may be appropriately designed. For example, as shown in FIG. 6B, an array of a plurality of circular through-holes 49 having the same diameter may be provided in each of an inner circumferential edge portion and an outer circumferential edge portion of the air-flow rectifying plate 47, and an array of circular through-holes 49 having a larger diameter may be provided in an intermediate portion between the inner circumferential edge portion and the outer circumferential edge portion. Alternatively, as shown in FIG. 6C, an array of a plurality of circular through-holes 49 having the same diameter may be provided in the inner circumferential edge portion of the air-flow rectifying plate 47, and an array of ellipsoidal through-holes 49 whose major axis direction corresponds to the radial direction of the air-flow rectifying plate 47 may be provided on the outer circumferential side of the air-flow rectifying plate 47. Alternatively, as shown in FIG. 6D, only an array of ellipsoidal through-holes 49 whose major axis direction corresponds to the radial direction of the air-flow rectifying plate 47 may be provided.

Regardless of any shape, number, and positions designed for the through-holes of the air-flow rectifying plate 47, the ratio (hole area ratio) of the total area of all the through-holes 49 to the entire area of the air-flow rectifying plate 47 is preferably in a range of 20 to 50%, and more preferably, in a range of 30 to 40%, taking the balance between the rectification effect and the pressure loss into account.

Figure 7A:
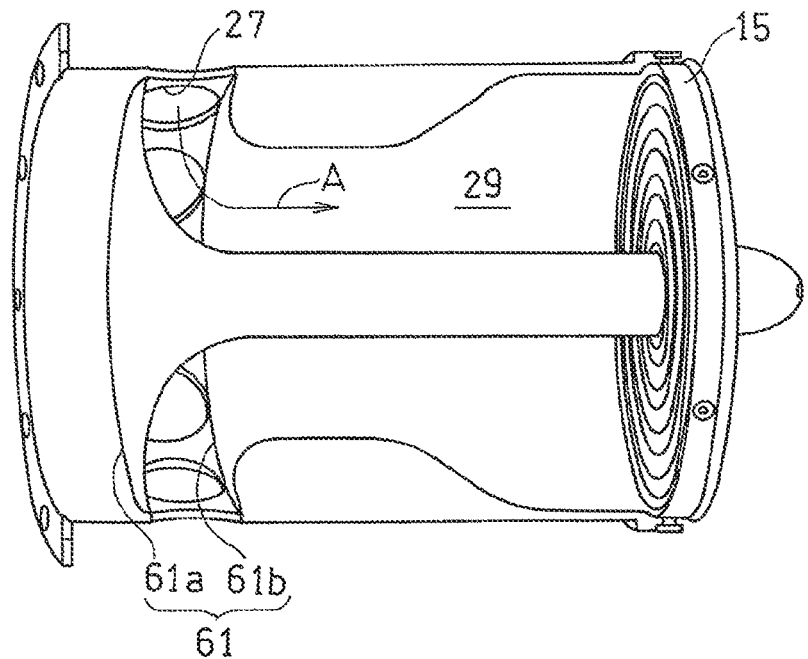
FIG. 7A is a perspective view showing a modification of an air-flow rectifying mechanism of the combustor shown in FIG. 2.
Figure 7B:
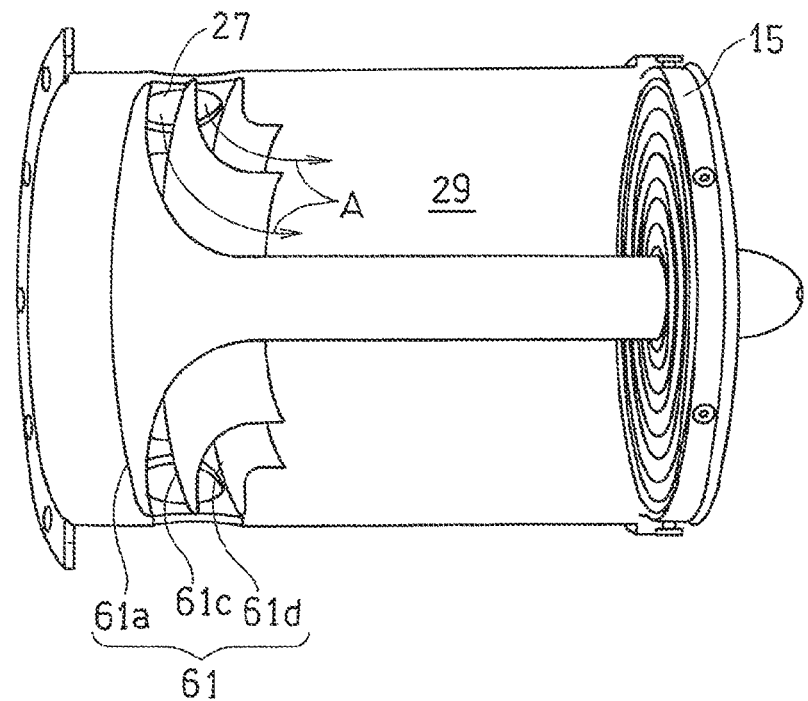
FIG. 7B is a perspective view showing another modification of an air-flow rectifying mechanism of the combustor shown in FIG. 2.

As the air-flow rectifying mechanism that rectifies flow of the air A introduced from the air introduction hole 27 to the air supply passage 29 into a uniform air flow toward the fuel injector 15, in place of the air-flow rectifying plate 47, a rectifying duct unit 61 may be provided as shown in FIGS. 7A and 7B. FIG. 7A shows a rectifying duct unit 61 including: a rectifying duct 61a extending from the upstream side of the air introduction hole 27 to the fuel injector 15 so as to have a diameter decreasing toward the downstream side; and a rectifying duct 61b extending from the downstream side of the air introduction hole 27 to the fuel injector 15 so as to have a diameter increasing toward the downstream side. FIG. 7B shows a rectifying duct 61 unit including: a rectifying duct 61a extending from the upstream side of the air introduction hole 27 to the fuel injector 15 so as to have a diameter decreasing toward the downstream side; a rectifying duct 61c extending from the center position of the air introduction hole 27 to the fuel injector 15 so as to have a diameter decreasing toward the downstream side; and a rectifying duct 61d extending from the downstream side of the air introduction hole 27 to the fuel injector 15 so as to have a diameter decreasing toward the downstream side. By providing the air-flow rectifying plate 47 or the rectifying duct 61 as the air-flow rectifying mechanism, uniform air flow is supplied to the fuel injector 15. Therefore, generation of $NO_x$ is suppressed by uniform combustion, and backfiring phenomenon can be reliably prevented.

Further, as shown in FIG. 3, the combustor 3 is provided with a rectifying protrusion member 63 that is positioned on the axis C, and protrudes through the fuel injector 15 toward the combustion chamber 11. The rectifying protrusion member 63 is positioned in the air supply passage 29, and includes a cylindrical support portion 63a, and a protruding portion 63b positioned in the combustion chamber 11. While the rectifying protrusion member 63 is mounted to the fuel injector 15 in the illustrated example, the rectifying protrusion member 63 may be mounted to the fuel supply main pipe 31. In either case, a front end (an end portion on the fuel supply main pipe 31 side) of the support portion 63a of the rectifying protrusion member 63 is positioned upstream of the fuel injector 15. An end portion of the protruding portion 63b is formed in a substantially hemispherical shape. The rectifying protrusion member 63 may be dispensed with. However, when the rectifying protrusion member 63 is provided, flame can be stably maintained in the vicinity of the axis C position in the combustion chamber 11, which flame is formed by the fuel jetted from the fuel injection annular portions 33 positioned on the radially inner side of the fuel injector 15, and the air supplied from the combustion air annular portions 35.

The fuel injection member 34, the air guide member 36, the supporting ring member 43, and the rectifying protrusion member 63, which are components of the fuel injector 15, may be integrally formed, or may be separately formed and then connected to each other by, for example, inserting pins in the radial direction.

Next, a mechanism for supplying a fuel to the fuel injection member 34 in the combustor 3 will be described. The combustor 3 of the present embodiment includes a plurality of fuel supply passages capable of independently supplying the fuel F to the respective fuel injection annular portions 33 of the fuel injection member 34. Specifically, the fuel supply main pipe 31 is connected to the respective fuel injection annular portions 33 through a plurality of branch fuel supply pipes 66 that independently branch from the main pipe 31. The fuel supply main pipe 31 has a multiple pipe structure (double pipe structure) in which a plurality of (two in the illustrated example) cylindrical pipes, i.e., an inner first fuel supply pipe 64 and a second fuel supply pipe 65 disposed outside the first fuel supply pipe 64 are concentrically superposed. An inner space of the first fuel supply pipe 64 forms a first fuel supply passage 67, and a space between the first fuel supply pipe 64 and the second fuel supply pipe 65 forms a second fuel supply passage 69. The fuel F supplied from the outside to the fuel supply passages 67 and 69 in the fuel supply main pipe 31 is supplied to the respective fuel injection annular portions 33 through the fuel supply passages formed in the respective branch fuel supply pipes 66. In the present embodiment, the fuel F which flowed through the first fuel supply passage 67 is supplied to two fuel injection annular portions 33 (hereinafter referred to as "first annular portion group") disposed on the inner diameter side among the plurality of fuel injection annular portions 33, via two branch fuel supply pipes 66 connected to the first fuel supply pipe 64. The fuel F which flowed through the second fuel supply passage 69 is supplied to two fuel injection annular portions 33 (hereinafter referred to as "second annular portion group") disposed on the outer diameter side among the plurality of fuel injection annular portions 33, via two branch fuel supply pipes 66 connected to the second fuel supply pipe 65. A control valve 71 capable of adjusting the fuel flow rate is provided in each of an upstream portion 67a, of the first fuel supply passage 67, extended to the outside of the housing H, and an upstream portion 69a, of the second fuel supply passage 69, extended to the outside of the housing H. By adjusting an opening degree of the control valve 71 of each fuel supply passage 67, 69, the flow rate of the fuel F supplied to each annular portion group of the fuel injection annular portions 33 can be independently controlled.

The number of the fuel injection annular portions 33 constituting the annular portion group as a unit to which the fuel F is independently supplied is not limited to the above example. For example, one fuel injection annular portion 33 may constitute one annular portion group (four annular portion groups are constituted in total). Alternatively, two fuel injection annular portions 33 on the inner diameter side may constitute one annular portion group, and each of two fuel injection annular portions 33 on the outer diameter side may constitute one annular portion group (three annular portion groups are constituted in total). In accordance with the number of the annular portion groups thus constituted, the number of the fuel supply passages and the number of the control valves are determined.

The above fuel supply mechanism allows the fuel supply amount to each fuel injection annular portion 33 of the fuel injection member 34 to be independently controlled in accordance with the load on the gas turbine GT. That is, the fuel injection member 34 can be divided into the fuel injection annular portions 33 that perform fuel supply and the fuel injection annular portions 33 that do not perform fuel supply. Therefore, an operation according to output change from a rated load to a partial load (staging combustion) is realized. In the case where the fuel F is dispersively jetted from the plurality of fuel injection holes 39 of the fuel injection member 34 as shown in the present embodiment, it is more effective for stable and low-$NO_x$ combustion to cope with the load change by selecting the fuel injection annular portions 33 to be operated and the fuel injection annular portions 33 not to be operated than by averagely changing the fuel supply amount from all the fuel injection annular portions 33. In the present embodiment, the plurality of fuel supply passages 67 and 69 are branched from a single fuel supply source (not shown), and the fuel supply amount is independently controlled by means of the control valves 71 provided in the fuel supply passages 67 and 69. However, the fuel F may be independently supplied from a plurality of fuel supply sources to the respective fuel supply passages 67 and 69.

The number of the branch fuel supply pipes 66 connected to each fuel injection annular portion 33 of the fuel injection member 34 may be appropriately set in accordance with the fuel injection amount from the fuel injection annular portion 33. For example, preferably, the number of the branch fuel supply pipes 66 connected to the fuel injection annular portion 33 disposed on the inner diameter side is decreased while the number of the branch fuel supply pipes 66 connected to the fuel injection annular portion 33 disposed on the outer diameter side is increased. When a plurality of branch fuel supply pipes 66 are connected to one fuel injection annular portion 33, the connection positions in the fuel injection annular portion 33 are preferably at equal intervals in the circumferential direction.

Further, the multiple pipe structure of the fuel supply main pipe 31 is not limited to the example shown in FIG. 3, and any structure may be adopted as long as a plurality of fuel supply passages independent from each other can be formed by using a plurality of pipes. For example, a multiple pipe structure may be employed in which, in one main pipe having a large diameter, a plurality of fuel supply pipes having same diameters smaller than the diameter of the main pipe are extended in parallel. However, in the case where, as illustrated referring to the present embodiment, the fuel supply main pipe 31 has the multiple pipe structure in which a plurality of fuel supply pipes having different diameters are concentrically superposed, and the inner space of the innermost-diameter-side fuel supply pipe and the space between the respective pipes are used as fuel supply passages, it is easy to set the areas of the passages such that the area of the outer-diameter-side fuel supply passage (the second fuel supply passage 69 in the example shown in FIG. 3) that supplies the fuel to the outer-diameter-side fuel injection annular portion 33 that requires more amount of fuel is set to be large while the area of the inner-diameter-side fuel supply passage (the first fuel supply passage 67 in the example of FIG. 3) that supplies the fuel to the inner-diameter-side fuel injection annular portion 33 that requires less amount of fuel is set to be small.

Next, a description will be given of an internal cooling mechanism or a heat shielding mechanism for the fuel injection member 34 and the rectifying protrusion member 63 which face the combustion chamber 11 and are exposed to high temperature of the combustion chamber 11.

Regarding the fuel injection member 34, as described above, the rear wall 33a, of the fuel injection member 34, opposing the combustion chamber 11 is disposed perpendicularly to the axis C direction. As shown in FIG. 8, the air guide member 36 guides, in the axis C direction, the air A supplied from upstream to the fuel F jetted from the fuel injection holes 39 of the fuel injection member 34. The fuel injection annular portion 33 is formed as a hollow portion, and the hollow space forms an annular fuel flow passage 73 that allows the fuel F to flow in the circumferential direction in the fuel injection annular portion 33. That is, the rear wall 33a of the fuel injection member 34 and a portion of an inner wall of the annular fuel flow passage 73 are the same wall, and a wall surface thereof on the combustion chamber side is a rear wall surface 33ab while a wall surface thereof on the fuel flow passage side is an inner wall surface 33aa.

The branch fuel supply pipe 66 is connected from a front wall (a wall on the air supply passage 29 side) 33b side of the fuel injection member 34 to an annular fuel flow passage 73a so as to supply the fuel F. In the fuel injection annular portion 33 of the fuel injection member 34, two annular fuel flow passages 73a and 73b partitioned in the axis C direction of the combustor 3 are formed. In other words, in the fuel injection annular portion 33, the downstream side fuel flow passage 73b (first fuel flow passage) that is positioned on the rear side (on the combustion chamber 11 side) and supplies the fuel F to the fuel injection holes 39, and an upstream side fuel flow passage 73a (second fuel flow passage) that is positioned on the front side (the air supply passage 29 side) and is directly supplied with the fuel F, are formed.

On an annular first partition wall 77 partitioning the upstream side fuel flow passage 73a and the downstream side fuel flow passage 73b, a plurality of through-holes that introduce the fuel from the upstream side fuel flow passage 73a to the downstream side fuel flow passage 73b are arranged in the circumferential direction. These through-holes serve as supply holes 79 that connect the two fuel flow passages 73a and 73b, and supply the fuel F from the upstream side fuel flow passage 73a to the downstream side fuel flow passage 73b. The fuel F introduced from the branch fuel supply pipe 66 to the upstream side fuel flow passage 73a flows in the upstream side fuel flow passage 73a in the circumferential direction, and successively flows into the downstream side fuel flow passage 73b through the supply holes 79. The fuel F having flowed in the downstream side fuel flow passage 73b through the supply holes 79 collides against the inner wall surface 33aa of the rear wall 33a and flows in the downstream side fuel flow passage 73b in the circumferential direction, and is guided to the fuel injection holes 39. Thus, by partitioning the inside of the fuel injection annular portion 33 of the fuel injection member 34 into the upstream side fuel flow passage 73a and the downstream side fuel flow passage 73b in the axis C direction of the combustor 3, the fuel F is supplied to the fuel injection holes 39 while being uniformly distributed in the circumferential direction.

Further, when the fuel F having flowed in the downstream side fuel flow passage 73b collides against the inner wall surface 33aa of the rear wall 33a, the fuel F cools the rear wall 33a by impingement cooling. In the illustrated example, the first partition wall 77 is provided with a nozzle wall 81 protruding rearward and extending in the circumferential direction, and a plurality of supply holes 79 are provided in the circumferential direction in the nozzle wall 81. The nozzle wall 81 forms an injection nozzle that jets the fuel F in the upstream side fuel flow passage 73a toward the rear surface 33aa that is the wall surface of the downstream side fuel flow passage 73b on the combustion chamber 11 side. Specifically, the fuel injection annular portion 33 includes: the downstream side fuel flow passage 73b that is positioned on the combustion chamber 11 side and is connected to the fuel injection holes 39; the upstream side fuel flow passage 73a that is positioned on the opposite side from the combustion chamber 11 and is supplied with the fuel F jetted from the fuel injection holes 39; and the injection nozzle that jets the fuel F in the upstream side fuel flow passage 73a toward the inner wall surface 33aa of the downstream side fuel flow passage 73b on the combustion chamber 11 side. Thereby, the fuel F is jetted to the inner wall surface 33aa of the downstream side fuel flow passage 73b on the combustion chamber 11 side, whereby the inner wall surface 33aa is cooled by impingement cooling. That is, the rear wall 33a is extremely effectively cooled by the fuel F. The injection nozzle may not necessarily have the nozzle wall 81, and may be a throttle nozzle formed in the first partition wall 77. Further, in the middle of the passage from the inner wall surface 33aa of the rear wall 33a to which the fuel F is jetted from the supply holes 79 to the fuel injection holes 39, a protruding wall 83 extending in the circumferential direction is provided so as to protrude from the inner wall surface 33aa of the rear wall 33a, whereby the effect of convection cooling caused by the fuel F flowing in the downstream-side fuel flow passage 73b is further enhanced.

Further, regarding the shape of the fuel flow passage 73 provided in the fuel injection annular portion 33 of the fuel injection member 34, only one fuel flow passage 73 may be provided as shown in a modification of FIG. 9. In this case, the rear wall 33a, of the fuel injection annular portion 33, opposing the combustion chamber 11 can be cooled from the inner side (the inner wall surface 33aa side) by convection cooling with the fuel F.

Further, a second partitioning wall 87 may be provided in the middle of the passage along which the fuel F is guided from the fuel flow passage 73 to the fuel injection holes 39, so that the fuel F supplied from each branch fuel supply pipe 66 flows substantially uniformly in the fuel flow passage 73, and thereby the effect of convection cooling is sufficiently achieved. In other words, the annular fuel flow passage 73 may be divided into three annular spaces by an outer-circumferential-side partitioning wall 87a and an inner-circumferential-side partitioning wall 87b.

Further, a heat shielding plate 85 may be provided on the rear wall surface 33ab of the rear wall 33a. As a material of the heat shielding plate 85, for example, Hastelloy-X (Haynes International. Inc.: registered trademark) or HA188 (Haynes International. Inc.: registered trademark) which are alloys having corrosion resistance and thermal resistance, or a combination of the alloy and ceramic coating, may be used. Also in the example shown in FIG. 8, the heat shielding plate 85 can be selectively combined.

Figure 10:
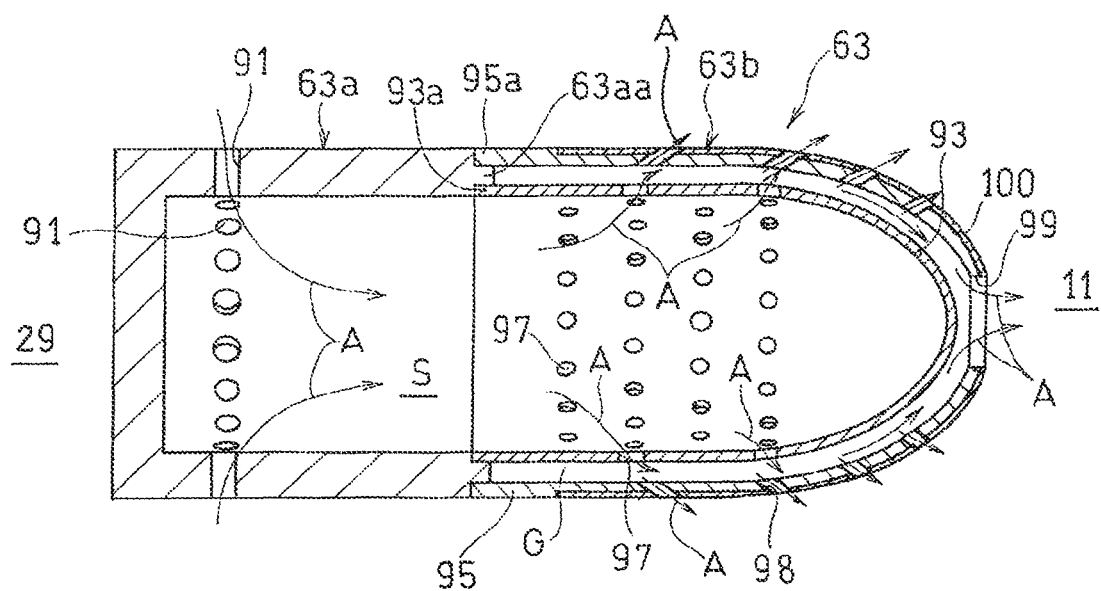
FIG. 10 is a vertical cross-sectional view showing an internal structure of a rectifying protrusion member used in the combustor shown in FIG. 2.

As shown in FIG. 10, the rectifying protrusion member 63 is formed as a hollow member as a whole. The support portion 63a of the rectifying protrusion member 63 is formed of a cylindrical member having a bottom, and cooling air introduction holes 91 in the form of radial through-holes are formed in a front-end (upstream-end) circumferential wall thereof. A plurality of cooling air introduction holes 91 are formed at equal intervals in the circumferential direction of the front-end circumferential wall of the support portion 63a. The protruding portion 63b of the rectifying protrusion member 63 has a double-wall structure including a dome-shaped inner wall 93 and a dome-shaped outer wall 95 each having a diameter decreasing toward the combustion chamber side (right side in FIG. 10). The protruding portion 63b does not necessarily have the dome shape, and may have a cylindrical shape. Further, the protruding portion 63b does not necessarily have the double-wall structure, and may have a single-wall structure including only the outer wall. In a circumferential wall of the inner wall 93 of the protruding portion 63b, first cooling air injection holes 97 as radial through-holes are provided. A plurality of first cooling air injection holes 97 are formed at equal intervals in the circumferential direction and the axial direction of the circumferential wall of the inner wall 93. In addition, the outer wall 95 of the protruding portion 63b has a circumferential wall provided with a plurality of second cooling air injection holes 98 each formed as a through-hole extending obliquely rearward with respect to radial direction. The plurality of second cooling air injection holes 98 are arranged equally spaced from each other in the circumferential direction and the axial direction of the circumferential wall of the outer wall 95.

In the center of an end portion of the outer wall 95 of the protruding portion 63b, a cooling air discharge hole 99 as an axial through-hole is provided. In other words, the rectifying protrusion member 63 includes the cooling air introduction hole 91 that is formed at the front end of the support portion 63a and introduces the air A from upstream of the fuel injector 15 into the rectifying protrusion member 63, and the cooling air discharge hole 99 that is formed in the protruding portion 63b and discharges the air A introduced into the rectifying protrusion member 63, to the combustion chamber 11.

An inner space S defined by the support portion 63a and the inner wall 93 of the protruding portion 63b and a gap G defined by the inner wall 93 and the outer wall 95 of the protruding portion 63b communicate with each other via only the first cooling air injection holes 97 of the inner wall 93. In the illustrated example, a fitting protruding wall 63aa is provided at an opening edge portion of the support portion 63a, and an opening edge portion 93a of the inner wall 93 fits the inner circumferential side of the fitting protruding wall 63aa, and an opening edge portion 95a of the outer wall 95 fits the outer circumferential side of the fitting protruding wall 63aa. Thereby, the support portion 63a and the protruding portion 63b are connected to each other.

In the case where the protruding portion 63b has the single-wall structure including only the outer wall, a part of the air A in the air supply passage 29 flows from the cooling air introduction hole 91 into the inner space S of the rectifying protrusion member 63, and is discharged from the cooling air discharge hole 99 to the combustion chamber 11 while cooling, as a cooling medium, the protruding portion 63b facing the combustion chamber 11, from the inner side by convection cooling. Further, in the case where the protruding portion 63b has the double-wall structure including the inner wall 93 and the outer wall 95, a part of the air A that has flowed from the cooling air introduction hole 91 into the inner space S of the rectifying protrusion member 63 is radially jetted as a cooling medium from the first cooling air injection holes 97 of the inner wall 93. This air A collides against the inner circumferential surface of the outer wall 95, flows along this inner circumferential surface, passes through the cooling passage which is the gap G between the inner wall 93 and the outer wall 95, and is discharged from the cooling air discharge hole 99 to the combustion chamber 11. Since the air A collides against the inner circumferential surface of the outer wall 95 and flows along the inner circumferential surface, the outer wall 95 is cooled from the inner side, by impingement cooling. On the other hand, a portion of the air A having flowed into the gap G between the inner wall 93 and the outer wall 95 is discharged to the combustion chamber 11 through the second cooling air injection holes 98 of the outer wall 95. The air A injected from the second cooling air injection holes 98 forms an air film layer on a surface of the outer wall 95 to cool the outer wall 95 from the outside by effusion cooling. In this way, burnout of the rectifying protrusion member 63 can be prevented. The second cooling air injection holes 98 may be omitted.

Further, the outer circumferential surface of the outer wall 95 may be coated with a heat insulating material 100. As the heat insulating material 100, ceramics, Hastelloy-X (Haynes International. Inc.: registered trademark) or HA188 (Haynes International. Inc.: registered trademark) which are alloys having corrosion resistance and thermal resistance, and the like may be used. The coating with the heat insulating material 100 more reliably prevents burnout of the rectifying protrusion member 63.

As described above, in the combustor 3 of a gas turbine shown in FIG. 2 according to the present embodiment, the fuel injector 15 includes the fuel injection member 34 having the plurality of fuel injection annular portions 33, and each fuel injection annular portion 33 includes the plurality of fuel injection holes 39 in the outer circumferential surface thereof. Therefore, the fuel F is uniformly jetted from the entire surface of the fuel injector 15. Thereby, minute flame is maintained at multiple points on the entire surface of the fuel injector 15. Thus, occurrence of local high-temperature combustion is prevented, and low $NO_x$ combustion is realized. In addition, the structure in which the air A is supplied from upstream of the fuel F jetted from the fuel injection holes 39 prevents the flame from entering the fuel injector 15, whereby backfiring phenomenon is suppressed. Therefore, even when a highly-reactive fuel containing hydrogen is used as the fuel for the gas turbine GT, extremely stable combustion is maintained while suppressing generation of $NO_x$.

The fuel F used for the combustor 3 of the present embodiment is not limited to hydrogen gas, and may be, for example, liquid hydrogen, or a mixture fuel of hydrogen gas and other fuel gas (natural gas, CO, etc.), or other fuel gas (natural gas, CO, etc.) including no hydrogen. Further, while in the present embodiment the can type combustor 3 is described as an example, the above-described structure can also be applied to an annular combustor.

Figure 11:
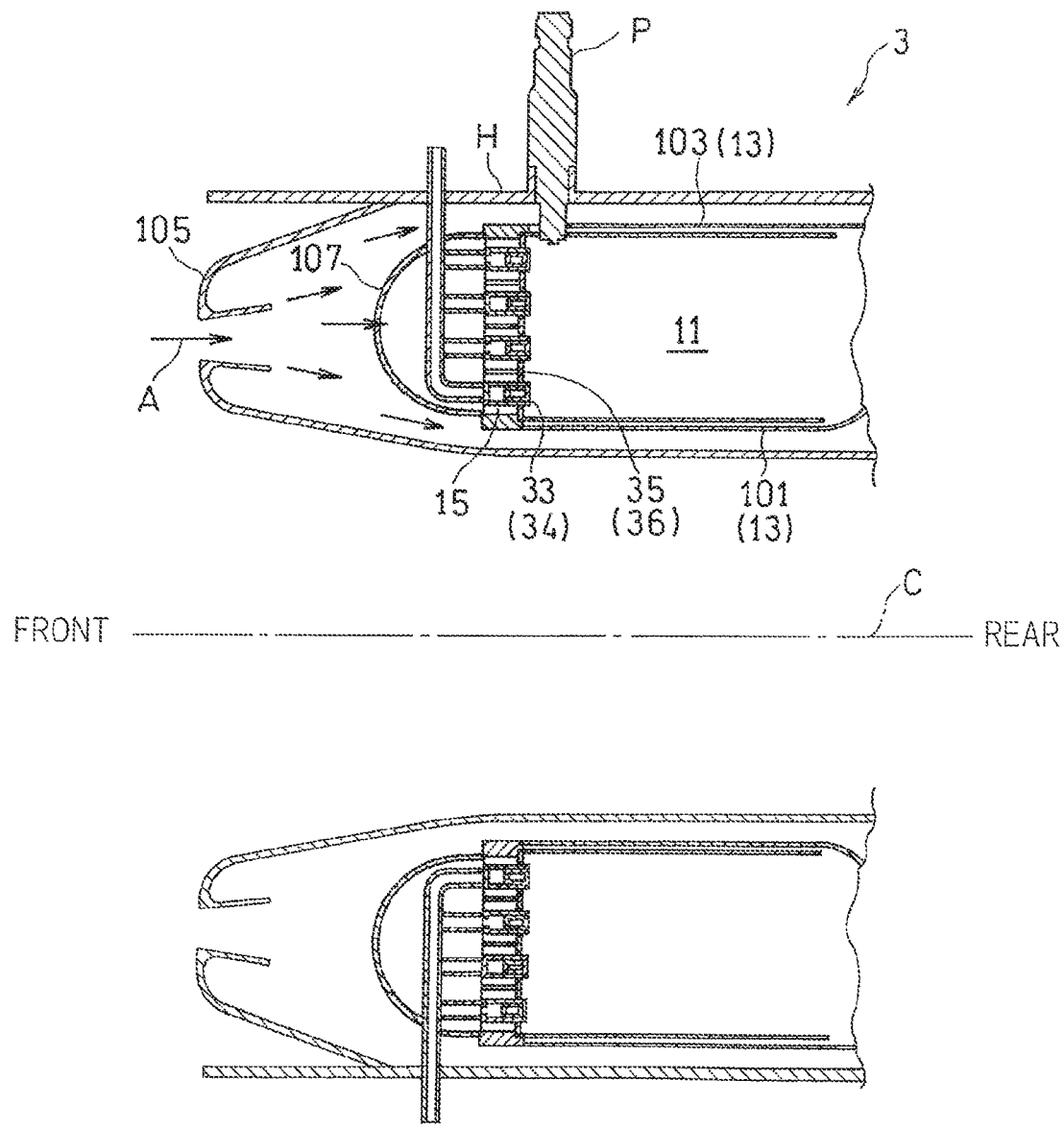
FIG. 11 is a cross-sectional view showing a combustor according to one embodiment in which the present invention is applied to an annular combustor.
Figure 12:
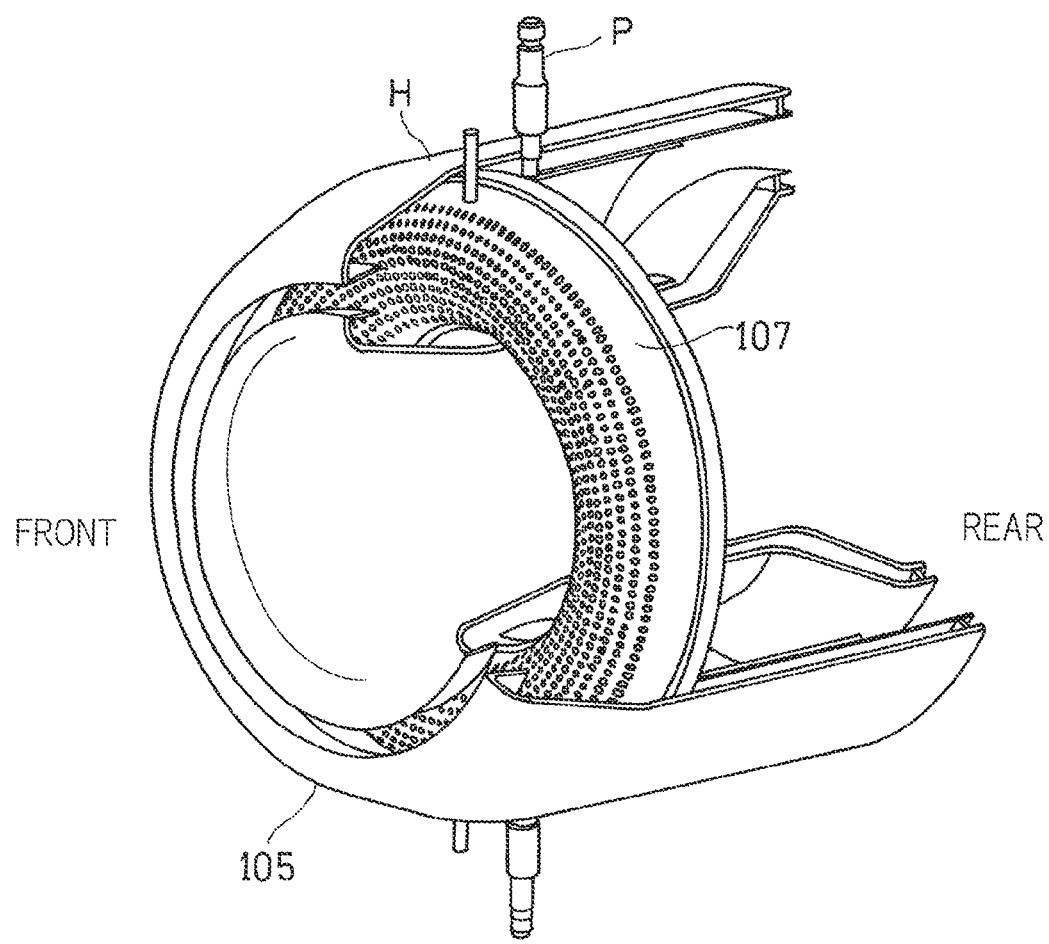
FIG. 12 is a partially cutaway perspective view of the combustor shown in FIG. 11.
Figure 13:
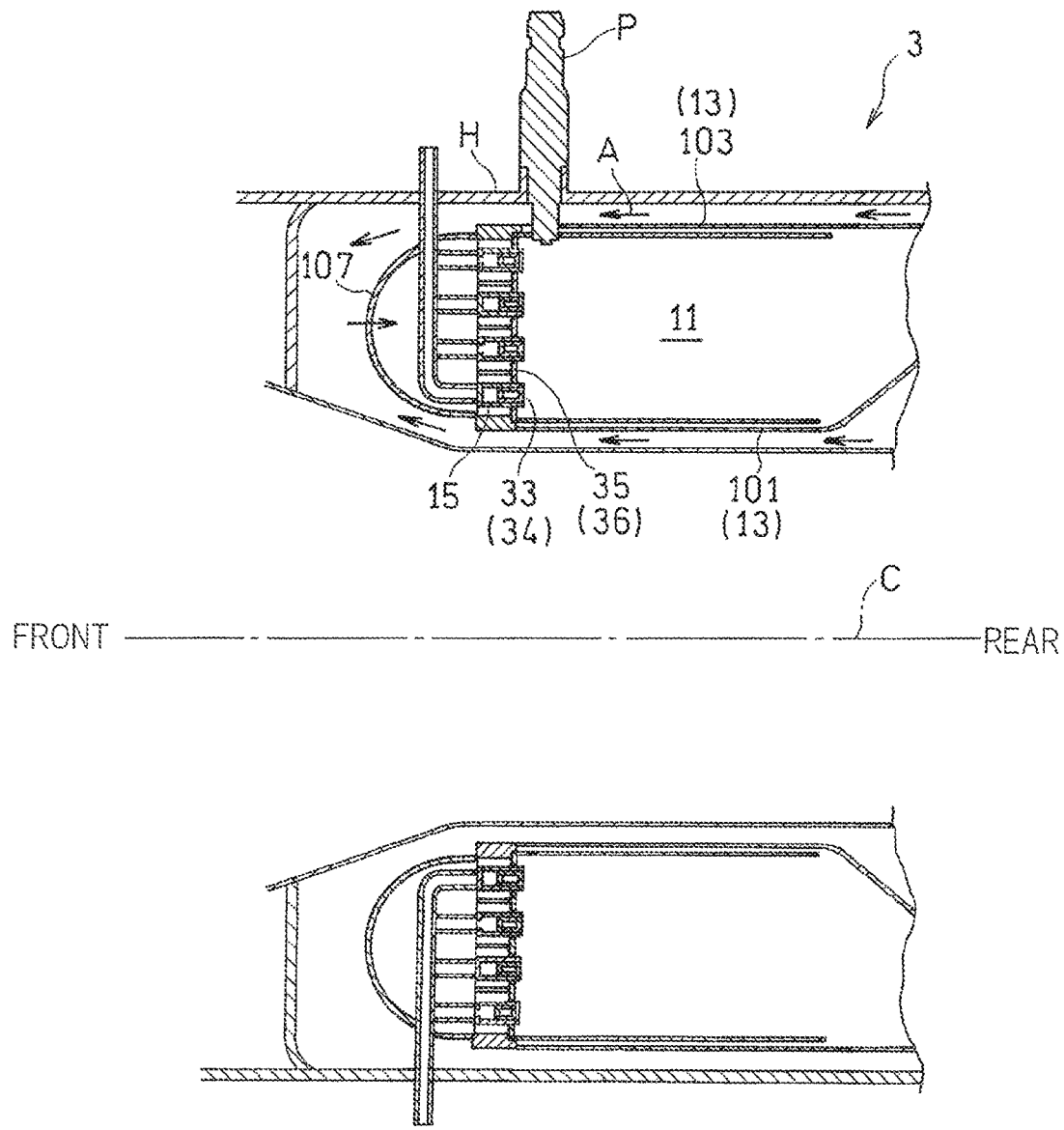
FIG. 13 is a cross-sectional view showing a combustor according to another embodiment in which the present invention is applied to an annular combustor.

An embodiment in which the present invention is applied to an axial-flow type annular combustor is shown in FIGS. 11 and 12, and an embodiment in which the present invention is applied to a reverse-flow type annular combustor is shown in FIG. 13. The combustors 3 according to these embodiments are identical to the embodiment shown in FIG. 2 in that each combustor 3 includes a combustion liner 13 having a combustion chamber 11 formed therein, and a fuel injector 15 mounted to a top portion of the combustion liner 13. The fuel injector 15 includes a fuel injection member 34 including a plurality of fuel injection annular portions 33 and an air guide member 36 including a plurality of combustion air annular portions 35 that guide the air for combustion. The fuel injection annular portions 33 and the combustion air annular portions 35 are arranged concentrically and alternately. The fuel injector 15 injects the fuel and the air into the combustion chamber 11. As described for the above embodiments with reference to FIG. 5, each fuel injection annular portion 33 has a plurality of fuel injection holes 39 that are open in the radial direction R, and each combustion air annular portion 35 has a plurality of air guide grooves 41 that are open in the axial direction thereof and guide the air A to the fuel F jetted from the fuel injection holes 39.

In the axial-flow type annular combustor 3 shown in FIG. 11, the combustion liner 13 is composed of a cylindrical inner wall 101, and an outer wall 103 disposed outside and concentrically with the inner wall 101. A space between the inner wall 101 and the outer wall 103 forms an annular combustion chamber 11. The air A compressed by the compressor 1 (FIG. 1) is introduced from the front side through a diffuser 105 into an annular combustor housing H, and is supplied to the fuel injector 15. A front end of the fuel injector 15 is covered with an air-flow rectifying cowl 107 as an air-flow rectifying mechanism. As shown in FIG. 12, the air-flow rectifying cowl 107 is an annular member having a forwardly swelling cross-sectional shape, and a plurality of holes allowing the air A to pass therethrough are formed therein.

Also in the reverse-flow type annular combustor 3 shown in FIG. 13, the combustion liner 13 is composed of a cylindrical inner wall 101, and an outer wall 103 disposed outside and concentrically with the inner wall 101, and a space between the inner wall 101 and the outer wall 103 forms an annular combustion chamber 11. The air A compressed by the compressor 1 (FIG. 1) passes, from the rear side, through an air introduction passage 25 formed between an housing H and the combustion liner 13, and thereafter, is supplied to the fuel injector 15. A front end of the fuel injector 15 is covered with an air-flow rectifying cowl 107 as an air-flow rectifying mechanism. Like in the example shown in FIG. 12, the air-flow rectifying cowl 107 is an annular member having a forwardly swelling cross-sectional shape, and a plurality of holes allowing the air to pass therethrough are formed therein.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

3 Combustor
11 Combustion chamber
13 Combustion liner
15 Fuel injector
33 Fuel injection annular portion
34 Fuel injection member
35 Combustion air annular portion
36 Air guide member
39 Fuel injection hole
41 Air guide groove
A Air
C Axis of combustor
F Fuel

What is claimed is:
1. A combustor comprising:
a combustion liner having a combustion chamber formed therein; and
a fuel injector mounted to a top portion of the combustion liner and configured to inject fuel and air into the combustion chamber, the fuel injector including a fuel injection member having a plurality of fuel injection annular bodies, and an air guide member having a plurality of combustion air annular bodies that guide the air for combustion, each of the plurality of fuel injection annular bodies and each of the plurality of combustion air annular bodies being arranged concentrically and alternately about a central axis of the combustor; wherein
each of the plurality of fuel injection annular bodies includes a plurality of fuel injection holes that are open in a radial direction of the respective fuel injection annular body of the plurality of fuel injection annular bodies,
each of the plurality of combustion air annular bodies includes a plurality of air guide grooves that are formed at circumferential positions corresponding to respective fuel injection holes of the plurality of fuel injection holes, are recessed in the radial direction of a respective combustion air annular body of the plurality of combustion air annular bodies, are open in an axial direction of the plurality of combustion air annular bodies, and guide the air to the fuel jetted from the respective fuel injection holes of the respective combustion air annular body,
for each of the plurality of combustion air annular bodies, each of the plurality of air guide grooves of the respective combustion air annular body are outwardly or inwardly open in the radial direction to an exterior of the respective combustion air annular body,
each of the plurality of fuel injection annular bodies includes: a first fuel flow passage that is positioned on a combustion chamber side and is communicated with the plurality of fuel injection holes; a second fuel flow passage that is positioned on a side opposite to the combustion chamber, and is supplied with the fuel to be jetted from the plurality of fuel injection holes; and an injection nozzle configured to jet the fuel in the second fuel flow passage to a wall surface of the first fuel flow passage on the combustion chamber side, and the fuel in the first fuel flow passage reverses direction with respect to an injection direction of the injection nozzle.

2. The combustor as claimed in claim 1, further comprising an air-flow rectifying mechanism provided upstream of the fuel injector, and configured to cause a flow of the air supplied to the air guide member to increase in uniformity.

3. The combustor as claimed in claim 1, further comprising a rectifying protrusion member that is provided on the central axis of the combustor and penetrates through the fuel injector so as to protrude toward the combustion chamber, the rectifying protrusion member configured to increase a stability of a flame formed by the fuel jetted from the plurality of fuel injection annular bodies.

4. The combustor as claimed in claim 3, wherein the rectifying protrusion member includes a support portion, and a protruding portion protruding from the support portion into the combustion chamber, and has a cooling air introduction hole that is formed in the support portion to introduce the air into the rectifying protrusion member, and a cooling air discharge hole that is formed in the protruding portion to discharge the air introduced into the rectifying protrusion member to the combustion chamber.

5. The combustor as claimed in claim 1, comprising:
a fuel supply main pipe having a multiple pipe structure, and configured to supply the fuel to the fuel injection member,
wherein the fuel supply main pipe includes a first supply passage configured to supply the fuel to a first annular body group of the plurality of fuel injection annular bodies, and a second supply passage configured to supply the fuel to a second annular body group of the plurality of fuel injection annular bodies.

6. The combustor as claimed in claim 1, wherein the plurality of air guide grooves of the air guide member are disposed only on an upstream side in a flow direction of the air relative to the plurality of fuel injection holes.

7. The combustor as claimed in claim 1, wherein each axial end of the plurality of air guide grooves of the plurality of combustion air annular bodies, on a side of the combustion chamber, is disposed further away from the combustion chamber than the plurality of fuel injection holes of the plurality of fuel injection annular bodies.

8. The combustor as claimed in claim 1, wherein each of the plurality of fuel injection annular bodies has a rectangular cross-sectional outline, and the plurality of fuel injection holes are provided in an outer circumferential wall and/or an inner circumferential wall of each of the plurality of fuel injection annular bodies.

9. The combustor as claimed in claimed in claim 1, wherein each of the plurality of combustion air annular bodies has an annular plate shape that is parallel to a plane perpendicular to the central axis of the combustor.

10. The combustor as claimed in claim 1, wherein each of the plurality of fuel injection holes of each of the plurality of fuel injection annular bodies is configured to inject the fuel radially with respect to the central axis.

11. The combustor as claimed in claim 1, wherein the respective combustion air annular body of the plurality of air annular bodies includes: a first air guide groove of the plurality of air guide grooves of the combustion air annular body that is outwardly open in the radial direction of the combustion air annular body; a second air guide groove of the plurality of air guide grooves of the combustion air annular body that is inwardly open in the radial direction of the combustion air annular body; and an annular body portion that circumferentially extends around a radial center of the combustion air annular body with a constant curvature, the annular body portion sandwiched between the first air guide groove and the second air guide groove in the radial direction of the annular body portion.

* * * * *